United States Patent
Bogen et al.

[11] Patent Number: 6,139,790
[45] Date of Patent: Oct. 31, 2000

[54] EQUIPMENT FOR MOULDING PRODUCTS OF THERMOPLASTICS MATERIAL, AND THE USE OF SUCH EQUIPMENT IN BLOW-MOULDING APPARATUS

[75] Inventors: Oddvar Bogen; Jon Olav Schia, both of Notodden, Norway

[73] Assignee: Norsk Hydro ASA, Oslo, Norway

[21] Appl. No.: 09/051,974

[22] PCT Filed: Oct. 23, 1996

[86] PCT No.: PCT/NO96/00247

§ 371 Date: Jun. 18, 1998

§ 102(e) Date: Jun. 18, 1998

[87] PCT Pub. No.: WO97/15434

PCT Pub. Date: May 1, 1997

[30] Foreign Application Priority Data

Oct. 25, 1995 [NO] Norway ................................. 954255

[51] Int. Cl.⁷ .................................................. B29C 49/64
[52] U.S. Cl. .......................... 264/540; 249/79; 249/102; 425/526; 425/812
[58] Field of Search ...................... 249/79, 102; 425/522, 425/526, 192 R, 195, 812, 183

[56] References Cited

U.S. PATENT DOCUMENTS

| | | | |
|---|---|---|---|
| 2,967,328 | 1/1961 | Shelby et al. | 425/164 |
| 3,020,595 | 2/1962 | Szajna | 425/526 |
| 3,353,219 | 11/1967 | Snyder | 425/405.1 |
| 3,354,509 | 11/1967 | Ammondson | 425/526 |
| 3,406,428 | 10/1968 | Brown | 425/86 |
| 3,632,249 | 1/1972 | Pearson | 425/526 |
| 4,872,827 | 10/1989 | Noda | 425/526 |

FOREIGN PATENT DOCUMENTS

| | | |
|---|---|---|
| 1486445 | 5/1967 | France . |
| 3743809 | 1/1989 | Germany . |
| 1160983 | 8/1969 | United Kingdom . |
| 2240300 | 7/1991 | United Kingdom . |

*Primary Examiner*—Robert Davis
*Attorney, Agent, or Firm*—Wenderoth, Lind & Ponack, L.L.P.

[57] ABSTRACT

Equipment for moulding products of thermoplastics material where a pre-heated parison (1) is encompassed by reciprocating mould sections (4) for shaping and cooling the parison. The equipment comprises a first plate (8) that is affixed to a reciprocating carrier part (5) at its one side, and that supports a mould plate (10) at its other side. The mould plate (10) is provided with one or more mould elements (3, 12), that may be removable. The first plate (8) is provided with a cooling circuit (6, 17), and a network of bores or channels (7, 9*a*) that communicates with corresponding bores/channels (9*b*) in the mould plate, for conducting gas (air) to or from orifice means (13) in the mould plate. The contact surfaces between the mould elements and the mould plate and between the mould plate and the plate (8) may be provided with grooves or recesses (11*a*, 11*b*, 11*c*, 11*d*), thereby providing a system of channels in the respective contact surfaces. The equipment makes possible that alteration of moulds may be performed rapidly by the use of simple means. The equipment may advantageously be used in conjunction with a blow-moulding apparatus, and, for instance in the production of prototypes and small production series.

20 Claims, 2 Drawing Sheets

EQUIPMENT FOR MOULDING PRODUCTS OF THERMOPLASTICS MATERIAL, AND THE USE OF SUCH EQUIPMENT IN BLOW-MOULDING APPARATUS

BACKGROUND OF THE INVENTION

The present invention relates to equipment for moulding products from a pre-heated parison of thermoplastics material, comprising at least two mould sections having one or more mould elements, where the sections are positionable to encompass the parison to shape and cool the parison. Each mould section is supported by a reciprocating carrier part and further comprises a cooling circuit for cooling the mould section, and a network of channels/bores that conducts gas (air) to/from orifices arranged in the mould section. The invention also relates to the use of the equipment in a blow-moulding apparatus.

Equipment of this type is particularly suitable for moulding hollow products, where a hollow parison is formed by an extrusion head in which a blow pin supplies pressurized gas (air) to the parison to expand it into conformity with the walls of the cavity formed by the interior of the closed mould sections.

GB Patent Specification No. 1,560,423 relates to apparatus for moulding extruded parisons. The apparatus comprises an extrusion head that forms a parison and brings it to a moulding zone where two reciprocating mould sections are adapted to encompass the parison. The mould sections are supported by two reciprocating carrier parts, the movement thereof being controlled according to a moulding cycle. This state of the art equipment may further comprise mould sections having a base part with mould elements inserted or shaped in the base part and a cooling circuit together with a network of channels/bores to conduct air to/from orifices arranged in conjunction with the mould elements. The cooling circuit and the network for air are connected to external systems by means of connectors provided in the base part. The cooling circuit comprises a system of channels/bores in both the base part and the mould elements, enforcing the use of seals or O-rings between removable mould elements and the base part.

As the above mentioned mould sections are removed out of the apparatus in connection with maintenance work or a change of moulds, the cooling circuit has to be opened. This implies that the connectors have to be detached, and coolant liquid will leak out of the circuit, causing a spill on the floor. Furthermore, as the mould sections are quite heavy, hoisting equipment is required when performing such operations. The following mounting operation has to be performed with a high degree of accuracy to obtain a correct position of the mould sections.

Mould elements that are removably inserted in the base part are attached by means of threaded connectors inserted at the forming side of the mould, because of the dimensions of the base part, and to avoid interference with the networks for air and cooling water. When a mould element has been replaced, the bores for the threaded connectors in the cavity wall have to be shut off or closed and followed by a finishing operation to obtain a desired degree of surface finish.

When finishing the surface of the mould element, a high degree of precision is required. To manipulate the mould element to and from the finishing station, hoisting/manipulating equipment is required. The above mentioned operations require the use of highly skilled man power.

SUMMARY OF THE INVENTION

According to the present invention there is achieved a simplification of equipment for moulding thermoplastics material, where a change and alteration/maintenance of moulds can be performed in a rapid and simple manner. These features are in particular advantageous when manufacturing products of small series and when performing prototype development in connection with new products (running test series). The invention implies that the mould cavities may now be altered or replaced with a substantial reduction of costs, as it requires less use of materials, finishing operations and highly skilled man power.

BRIEF DESCRIPTION OF THE DRAWINGS

Embodiments serving to further describe, but not limit, the invention are given in the following, where.

DETAILED DESCRIPTION OF THE PREFERRED EMBODIMENTS

Figure 1:
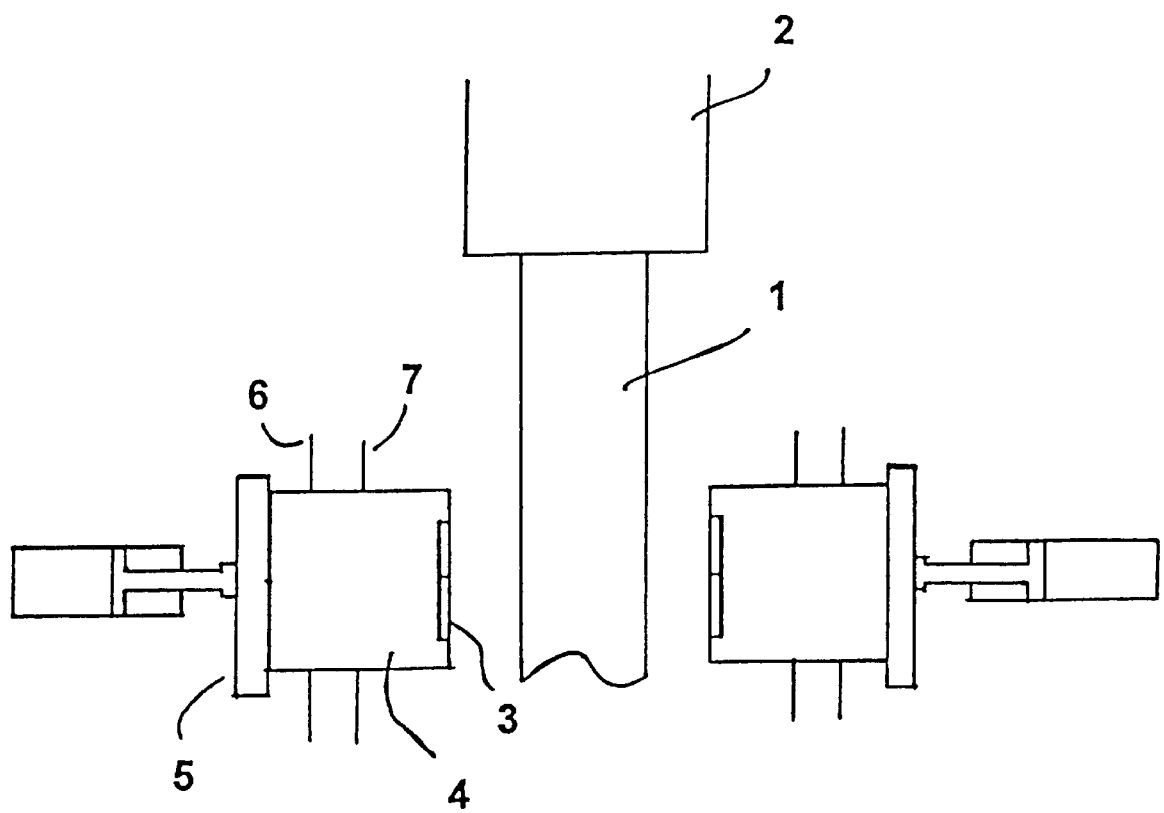
FIG. 1 is a principal sketch showing known equipment for moulding products of a thermoplastics material.

FIG. 1 shows a parison 1 extruded by means of an extruder head 2. A mould section 4, produced in one-piece and provided with removable inserts or mould elements 3, is attached to a reciprocating carrier part 5 that reciprocates the mould section in accordance with the moulding cycle. The mould section 4 is connected to external systems for cooling liquid and gas (air) by connectors 6 and 7 (not further shown).

Figure 2:
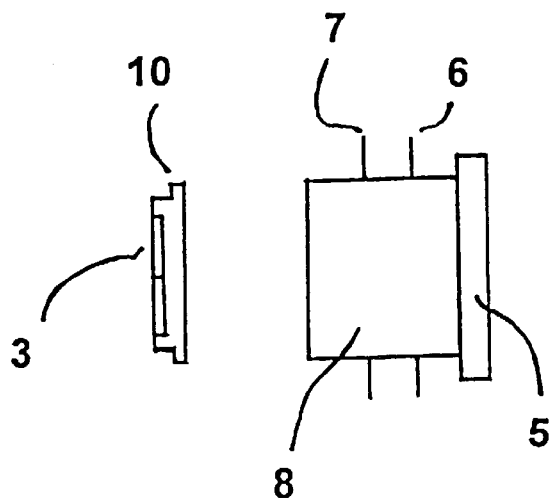
FIG. 2 shows a mould section according to the present invention.

FIG. 2 shows a mould section according to the invention, comprising a first plate 8 with a cooling circuit and a mould plate 10 in which mould elements 3, 12 are arranged. The first plate 8 is affixed to a carrier part 5 by one first side. The plate supports the mould plate 10 at its other side. The cooling circuit in the plate 8 has connectors 6 for connecting the circuit to an external system. The plate 8 further comprises a network of channels/bores for the transport of gas (air) (not shown) having connectors 7 for an external system. The mould plate 10 has a contact surface that co-operates with a similar surface at the plate 8. The mould plate 10 has therein the mould elements 3, 12 inserted so that they may be removable, and is further provided with channels/bores communicating with a corresponding network of channels/bores 9 in the plate 8 for the transport of gas (air).

Figure 3:
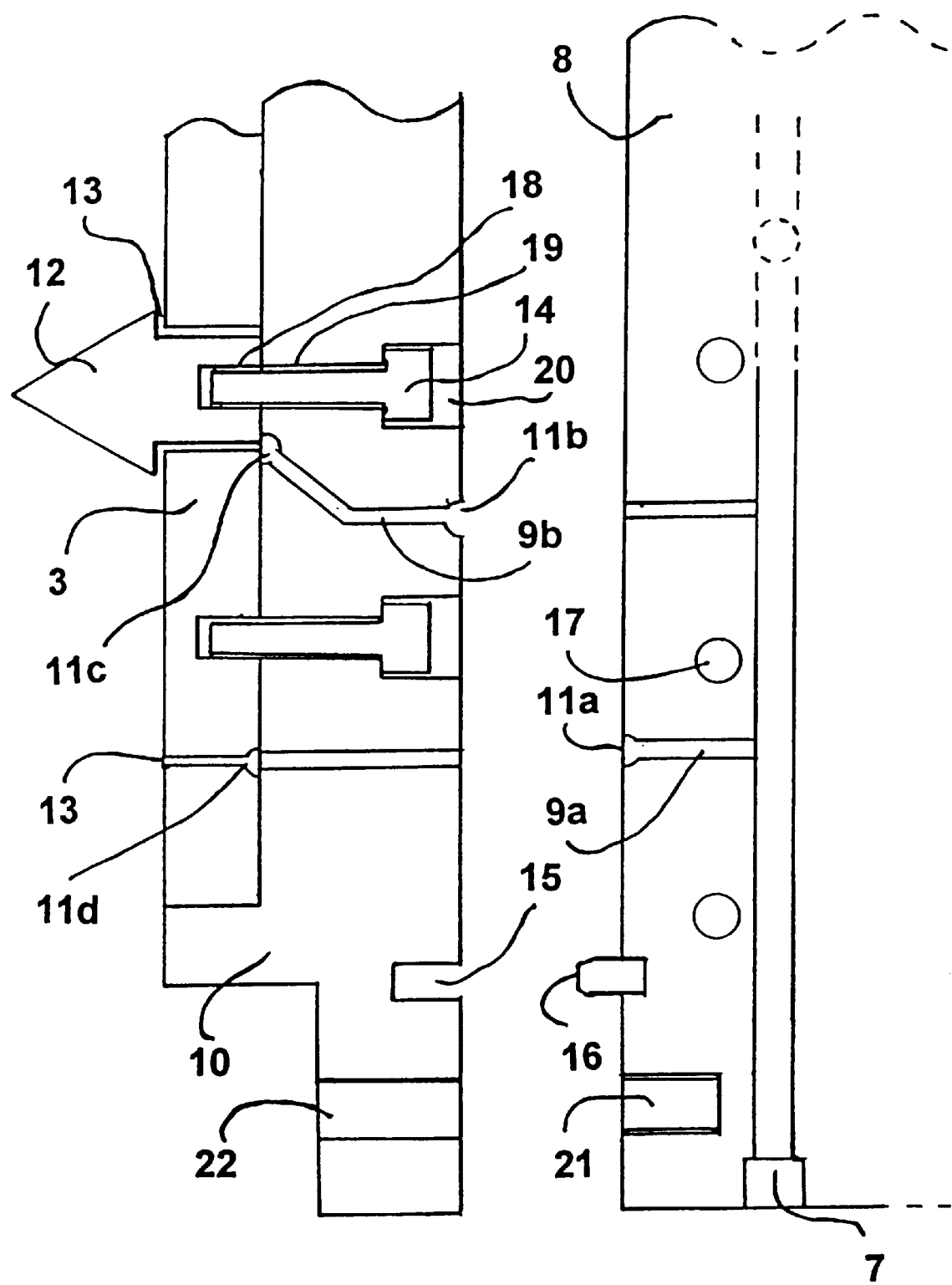
FIG. 3 shows an enlarged cut-out section shown in FIG. 2.

FIG. 3 shows an enlarged cut-out of the first plate 8 and the mould plate 10. The connector for gas (air) 7 communicates with a network for gas (air) 9a in the plate 8. The cooling circuit appears partly in the Figure as bores 17. In the contact surface that faces the mould plate 10 there may be arranged grooves or recesses 11a, thus forming channels in the contact surface between the plates. The mould plate 10 is provided with channels/bores for gas (air) 9b that alternatively may be in connection with grooves or recesses 11b in the contact surface facing the first plate 8. Similarly, grooves or recesses 11d, 11c may be arranged in the contact surface between the mould elements 3 and the mould plate 10, thus forming channels in the contact surface between the plates.

As shown in the Figure, an orifice 13 may be arranged between two mould elements 3, 12, or in such an element. The mould element 12, as shown here, may for instance be of a type that forms a recess in the moulded product, and is thus elevated with respect to the mould element 3. To ensure that the parison will come into firm abutment with the walls in the cavities of the mould between such mould elements, gas (air) that possibly may be located between the parison and the mould elements has to be evacuated in the forming phase of the parison. The orifice here is constituted by a slit arranged between the mould elements 3, 12. To ensure that the width of the slit is defined with a desired degree of accuracy, at least one of the mutual facing sides of the mould elements may be provided with a separator such as cams or lugs, or separator elements may be forced into the slit (not shown). It will be seen that affixing connectors 14 may enter from the side of the mould plate that faces the first plate 8. For instance, the mould elements may comprise threaded bores 18 that communicate with bores 19 and recesses 20 in the mould plate 10, which allows the use of ordinary machine screws to fasten the mould elements 3, 12 to the mould plate 10.

Tests carried out with a mould plate that was made out of aluminum and that had a thickness of 4 centimeters showed that a satisfactory cooling rate of the parison could be achieved even though the cooling of the mould plate was indirect. It was further experienced that a sufficient sealing between the gas (air) conduits in the first plate 8 and the mould plate 10 was achieved without the use of seals or the like. This was achieved by machining the contact surfaces of the plates to a sufficient degree with respect to flatness and surface roughness. Furthermore, it was shown that when using a mould plate of this thickness, a sufficient flatness was maintained in the contact surfaces when using fasteners (not shown) that protrude through bores 22 arranged in the periphery of the mould plate 10 and that come into engagement with bores 21 having internal threads in the plate 8. The arrangement of guiding lugs 16 that communicate with bores 15 in the facing sides of the plates allows a rapid and simple change of the mould without the use of alignment tools.

The arrangement of the orifice 13 between the mould elements together with the provision of grooves/recesses 11d, 11c in the contact surfaces between the mould elements 3, 12 and the mould plate 10, make possible the alteration of a mould plate to comply with a variety of combinations of mould elements by simple means. The change from elements 3, 12 to elements with a different shape, may possibly involve the forming of new bores 19 and recesses 20 for the fasteners in the mould plate 10. Normally, it will not be required to shut off or close bores that may become superfluous, as the passing bores 19 in the mould plate 10 will be sealed by mould elements 3, 12 at its one side, and by the plate 8 at its other side. If the orifice 13 has altered location versus the mould plate 10, it will simply be required to arrange new channels 9b between the groves 11a or 11b in the contact surfaces between the plate 8 and the mould plate 10, and the grooves 11c or 11d in the contact surfaces between the mould plate 10 and the mould elements 3, 12, to achieve communication between the orifice means 13 and the network for gas (air) 9a in the plate 8. Should more channels be required to be arranged in the contact surfaces, new grooves may easily be provided by performing a milling operation in the respective surfaces. If the mould elements are made out of steel and the mould plate of aluminum, it will be preferred to machine the grooves 11c in the mould plate.

As described above, rearrangement/alteration of the mould equipment according to the invention may be carried out rapidly by the use of simple means. The use of a mould plate of aluminum implicates that the machining operations mentioned above may be performed by the use of hand-held tools. Forming the grooves/recesses 11a, 11b, 11c, and 11d in such a manner that their width are larger than the width of the bores 9b in the mould plate 10 will support the possibility that the accuracy in the positioning of the bores 9b may be reduced.

What is claimed is:

1. Equipment for molding products from a pre-heated parison of thermoplastics material, comprising:
    at least two mold sections having at least one mold element, said at least two mold sections being positionable to encompass the parison and shape and cool the parison, wherein:
        each of said at least two mold sections is supported by a reciprocating carrier part,
        each mold section of said at least two mold sections comprises a cooling circuit for cooling said mold section, an orifice and a network of channels for conducting gas to and from said orifice, and
        at least one of said at least two mold sections comprises a first plate affixed to said carrier part on one side of said first plate; and
    a mold plate supported by an other side of said first plate, said mold plate having said at least one mold element mounted thereon, and said first plate and said mold plate having mutually cooperating contact surfaces in contact with each other provided with a sufficient roughness and flatness so as to provide for tightness and heat transfer between said contact surfaces;
    wherein said cooling circuit of said at least one of said two mold sections provided in said first plate so as to indirectly cool said mold plate and said at least one mold element on said mold plate; and
    wherein said network of channels for conducting gas to and from said orifice of said at least one of said two mold sections comprises channels in said first plate in communication with channels in said mold plate.

2. The equipment of claim 1, wherein at least one of said mutually cooperating contact surfaces comprises grooves or oblong recesses that connect said channels in said first plate of said network of channels with channels in said mold plate.

3. The equipment of claim 2, wherein said grooves or oblong recesses are provided in said first plate.

4. The equipment of claim 2, wherein said grooves or oblong recesses are provided in said mold plate.

5. The equipment of claim 1, wherein:
    said at least one mold element of said mold plate and said mold plate have mutually cooperating contact surfaces; and
    at least one of said mutually cooperating contact surfaces of said at least one mold element of said mold plate and said mold plate has grooves or oblong recesses therein connecting said channels of said mold plate with said orifice of said at least one mold element of said mold plate.

6. The equipment of claim 5, wherein said at least one mold element of said mold plate is affixed to said mold plate by a fastener entering said mold plate from a side of said mold plate facing said first plate.

7. The equipment of claim 1, wherein said at least one mold element of said mold plate comprises a plurality of mold elements and said orifice comprises a slit between said plurality of mold elements.

8. The equipment of claim 1, wherein said mold plate is made of aluminum, copper or brass.

9. The equipment of claim 1, wherein said mutually cooperating contact surfaces of said first plate and said mold plate that are in contact with each other are provided with the sufficient roughness and flatness to a degree sufficient to connect said channels of said first plate with said channels in said mold plate without requiring the use of sealing elements.

10. The equipment of claim 5, wherein said mutually cooperating contact surfaces of said at least one mold element of said mold plate and said mold plate that are in contact with each other are provided with a roughness and flatness to a degree sufficient to connect said channels of said at least one mold element of said mold plate with said channels in said mold plate without requiring the use of additional sealing elements.

11. A method of molding products from a pre-heated parison of thermoplastics material, comprising:

reciprocating at least two mold sections having at least one mold element with reciprocating carrier parts supporting the at least two mold sections so that the at least two mold sections are positioned to encompass the parison, wherein at least one of the at least two mold sections comprises a first plate affixed to the carrier part on one side of the first plate and a mold plate is supported by an other side of the first plate, the mold plate having the at least one mold element mounted thereon, the first plate and the mold plate having mutually cooperating contact surfaces in contact with each other provided with a sufficient roughness and flatness so as to provide for tightness and heat transfer between the contact surfaces, and each mold section comprising an orifice and a network of channels for conducting gas to and from the orifice;

shaping the parison with the at least one mold element of the at least two mold sections;

cooling the parison by indirect cooling of the mold plate and the at least one mold element through a cooling circuit provided for each mold section of the at least two mold sections, wherein the cooling circuit of the at least one of the two mold sections comprises a cooling circuit provided in the first plate indirectly cooling the mold plate and the at least one mold element on the mold plate; and conducting gas to and from the orifice of the at least one of the two mold sections by conducting gas through the network of channels, including channels in the first plate in communication with channels in the mold plate.

12. The method of claim 11, wherein at least one of the mutually cooperating contact surfaces comprises grooves or oblong recesses that connect the channels in the first plate of the network of channels with channels in the mold plate.

13. The method of claim 12, wherein the grooves or oblong recesses are provided in the first plate.

14. The method of claim 12, wherein the grooves or oblong recesses are provided in the mold plate.

15. The method of claim 11, wherein:

the at least one mold element of the mold plate and the mold plate have mutually cooperating contact surfaces; and at least one of said mutually cooperating contact surfaces of the at least one mold element of the mold plate and the mold plate has grooves or oblong recesses therein connecting the channels of the mold plate with the orifice of the at least one mold element of the mold plate.

16. The method of claim 15, wherein the at least one mold element of the mold plate is affixed to the mold plate by a fastener entering the mold plate from a side of the mold plate facing the first plate.

17. The method of claim 11, wherein the at least one mold element of the mold plate comprises a plurality of mold elements and the orifice comprises a slit between the plurality of mold elements.

18. The method of claim 11, wherein the mold plate is made of aluminum, copper or brass.

19. The method of claim 11, wherein the mutually cooperating contact surfaces of the first plate and the mold plate that are in contact with each other are provided with the sufficient roughness and flatness to a degree sufficient to connect the channels of the first plate with the channels in the mold plate without requiring the use of sealing elements.

20. The method equipment of claim 15, wherein the mutually cooperating contact surfaces of the at least one mold element of the mold plate and the mold plate that are in contact with each other are provided with a roughness and flatness to a degree sufficient to connect the channels of the at least one mold element of the mold plate with the channels in the mold plate without requiring the use of additional sealing elements.

\* \* \* \* \*